(12) United States Patent
Hammel et al.

(10) Patent No.: US 6,585,906 B2
(45) Date of Patent: Jul. 1, 2003

(54) METHOD FOR RECYCLING A DISK HAVING A LAYERED STRUCTURE ON A GLASS SUBSTRATE

(75) Inventors: Dirk Hammel, Worms (DE); Holger Roehl, Mainz (DE); Theo Schmitz, Gau-Algesheim (DE); Johannes Windeln, Bodenheim (DE)

(73) Assignee: International Business Machines Corporation, Armonk, NY (US)

(*) Notice: Subject to any disclaimer, the term of this patent is extended or adjusted under 35 U.S.C. 154(b) by 12 days.

(21) Appl. No.: 09/994,120

(22) Filed: Nov. 26, 2001

(65) Prior Publication Data

US 2002/0084247 A1 Jul. 4, 2002

(30) Foreign Application Priority Data

Jan. 3, 2001 (DE) .......................................... 011 00 248

(51) Int. Cl.[7] .................................................. B44C 1/22

(52) U.S. Cl. .............................. 216/22; 216/74; 216/80; 134/1

(58) Field of Search .............................. 216/22, 74, 80; 134/1

(56) References Cited

U.S. PATENT DOCUMENTS 5,075,807 A * 12/1991 Inoue et al. .............. 360/97.02
5,754,366 A * 5/1998 Yoshino .................. 360/97.02

* cited by examiner

*Primary Examiner*—Benjamin L. Utech
*Assistant Examiner*—Shamim Ahmed
(74) *Attorney, Agent, or Firm*—Robert B. Martin; Bracewell & Patterson, L.L.P.

(57) ABSTRACT

A method for recycling a disk having a layered structure on a glass substrate is disclosed. Initially, the disk is exposed to gaseous sulphur dioxide in a humid environment. Then, the disk is treated with hot water to remove the layered structure from the glass substrate.

11 Claims, 3 Drawing Sheets

METHOD FOR RECYCLING A DISK HAVING A LAYERED STRUCTURE ON A GLASS SUBSTRATE

RELATED PATENT APPLICATION

The present patent application claims priority from a German application Application No. 01100248.2, filed on Jan. 3, 2001.

BACKGROUND OF THE INVENTION

1. Technical Field

The present invention relates to disk recycling in general, and in particular to a method for recycling a floppy disk having a layered structure on a glass substrate. Still more particularly, the present invention relates to a method for recycling a floppy disk having a layered structure on a glass substrate by removing the layered structure on the glass substrate.

2. Description of the Prior Art

Magnetic disks and photomagnetic disks are typically used as storage media for recording data processing information in computers. In recent years, substantial improvements have been made in the magnetic disk manufacturing by increasing the recording density while reducing the size and weight. For example, the diameters of magnetic disks have been reduced from 2.5 inches, to 1.8 inches and to 1.3 inches. Along with the diameter, the thickness of the disk substrate has also been reduced. Conventionally, an aluminum alloy has been used as the substrate material for magnetic disks. But in recent years, aluminum alloy has been replaced by glass that can provide smaller deformations, a more preferable flatness and better mechanical strengths.

Each year, billions upon billions of magnetic disks are fabricated. However, millions of the magnetic disks will have to be scrapped due to defects occurred during manufacture. More importantly, those scrapped magnetic disks cannot be easily and cost effectively recycled. For example, efforts to recycle scrapped magnetic disks have been made by immersing them in an acid solution, such as hydrochloric acid, to dissolve the layers present on the glass substrates. However, it has become apparent that the reaction time amounts to several hours, and what is even worse, the hydrochloric acid solution will attack the glass substrates and the chloride ions (Cl$^-$) also hold the danger of corroding the glass substrates. As a result, a substantial removal of the recycled substrate surface material is required, and the removal is done by a polishing process that removes several microns of the glass substrate material. Worse yet, the above-mentioned method of disk recycling allows only one single reuse because of the substrate thinning after the polishing process.

Under the prior art, a method for recycling disks, especially optical disks such as compact disks and digital video disks, having a layered structure with a reflective film and a dye layer, includes a step of retaining the disk in a liquid medium, a step of radiating ultrasonic waves onto the disk such that the substrate and the reflective film can separate from each other, and a step of bringing a solution into contact with the substrate separated from the reflective film such that the dye layer can be separated from the substrate in order to recover the substrate (the solution dissolves the dye layer). However, disadvantages of the above-mentioned method include high cost and the solution will attack the substrate to be recycled.

Consequently, it would be desirable to provide an improved method for recycling disks that is cost-effective and not harmful to glass substrates.

SUMMARY OF THE INVENTION

In accordance with a preferred embodiment of the present invention, a disk includes a layered structure on a glass substrate. Initially, the disk is exposed to gaseous sulphur dioxide in a humid environment. Then, the disk is treated with hot water to remove the layered structure from the glass substrate.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

Figure 1:
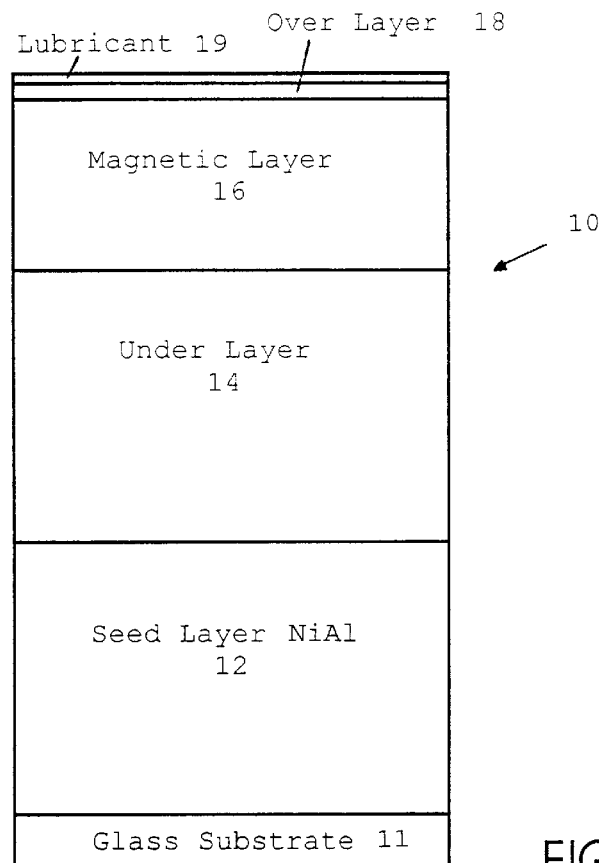
FIG. 1 is a diagram of a typical magnetic recording medium having a layered structure.

Referring now to the drawings and in particular to FIG. 1, there is illustrated a typical magnetic recording medium having a layered structure. As shown, a magnetic recording medium 10, such as a magnetic disk, includes a glass substrate 11 plated with a NiAl layer 12. On top of glass substrate 11 and NiAl layer 12, magnetic recording medium 10 also includes a chromium (Cr) or chromium vanadium (CrV) underlayer 14, a cobalt-base alloy magnetic layer 16, a protective carbon overcoat 18, and a lubricant topcoat 19. Chromium underlayer 14, cobalt-base alloy magnetic layer 16 and protective carbon overcoat 18 are deposited by sputtering techniques as it is well-known in the art.

Figure 2:
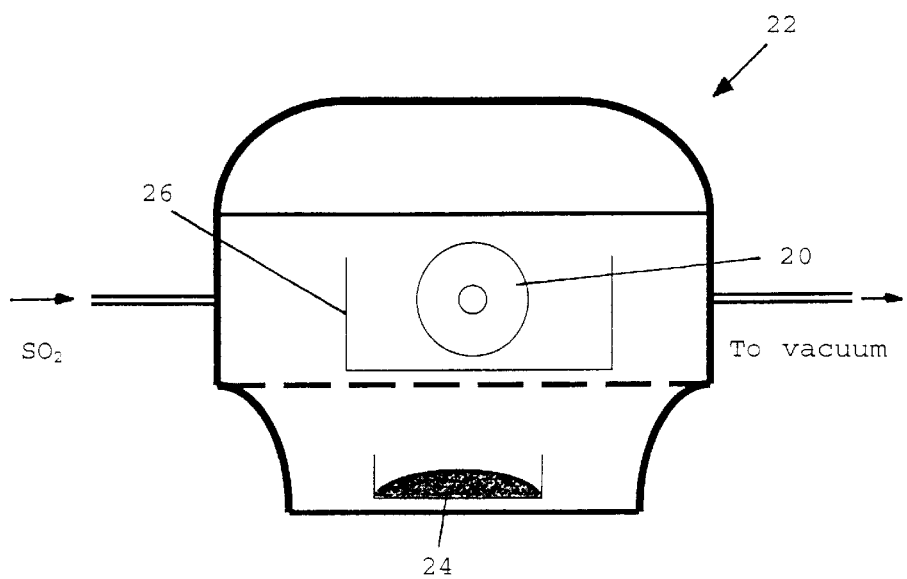
FIG. 2 is a diagram of an apparatus for carrying out a preferred method of the present invention.

In accordance with a preferred embodiment of the present invention, a defective magnetic disk having a glass substrate that includes the above-mentioned layered structure can be recycled by exposing to gaseous sulphur dioxide in the presence of humid air. With reference now to FIG. 2, there is illustrated an apparatus for carrying out the above-mentioned procedure. A magnetic disk 20, which is contained in a disk holder 26, is inserted into a drying apparatus such as a desiccator 22. A vessel 24 containing water is placed at the bottom chamber of desiccator 22. When a common desiccator, such as desiccator 22 having a volume of approximately 20–25 liters is used, vessel 24 may contain 1 to 1.5 milliliters of water. The amount of water present within desiccator 22 should only be sufficient to establish a humid environment within desiccator 22. The humidity value for the water vapor within desiccator 22 should be kept in the range of 6% and 98%. Humidity values below 60% do not yield satisfactory results, and the reaction will be severely reduced if humidity values are over 98%. Humidity value should preferably be kept between 85% and 95%.

Before placing magnetic disk 20 in desiccator 22, it may be advantageous to first remove lubricant topcoat 19 from magnetic disk 20. The removal of lubricant topcoat 19 can be accomplished by rinsing magnetic disk 20 with solvents before magnetic disk 20 is brought in contact with sulphur dioxide gas.

Subsequently, the atmosphere within desiccator 22 is evacuated to approximately 600 Torr, followed by an aeration of gaseous sulphur dioxide at approximately 20 Torr to 100 Torr. The evacuation of desiccator 22 is performed in order to guarantee a reproducible execution of the method of the present invention. Any other process for supplying a defined amount of sulphur dioxide gas can also be used. The concentration of sulphur dioxide gas is preferably in the range of 5 to 50 vol-%. Using values below 5 vol-% will drastically reduce the reaction velocity. The preferred range of sulphur dioxide gas within desiccator 22 is between 10 vol-% and 20 vol-%.

After applying the gaseous sulphur dioxide, desiccator 22 is allowed to aerate to ambient pressure for a certain amount of time, preferably in the range of 12 and 24 hours.

Subsequently, magnetic disk 20 is immersed into hot water. The temperature of the hot water should be in the range of approximately 80° C. to 95° C., but most preferably between 85° C. to 90° C. After immersing into hot water, the layered structure present on the glass substrate of magnetic disk 20 will delaminate spontaneously. The delamination can be enhanced by applying vibration to the hot water. It has been found that the layers will be separated completely down to the glass substrate, whereby material that may eventually remain on the glass substrate is comprised of the complete layer structure. The above-mentioned removal procedure can be repeat if there are some materials still remain on the glass substrate.

The mechanism of the delamination is not completely known yet. It was shown that the sulphur from the sulphur dioxide is present only between the lowest and the second lowest layer, i.e., in the NiAl-Cr interface. Obviously, the sulphur dioxide is able to diffuse through the layered structure within small channels present and concentrates at the NiAl-Cr interface. The concentration of sulphur at the NiAl-Cr interface is found to be approximately 21%. As a result, a reaction with NiAl and $H_2O$ may then take place.

Figure 3:
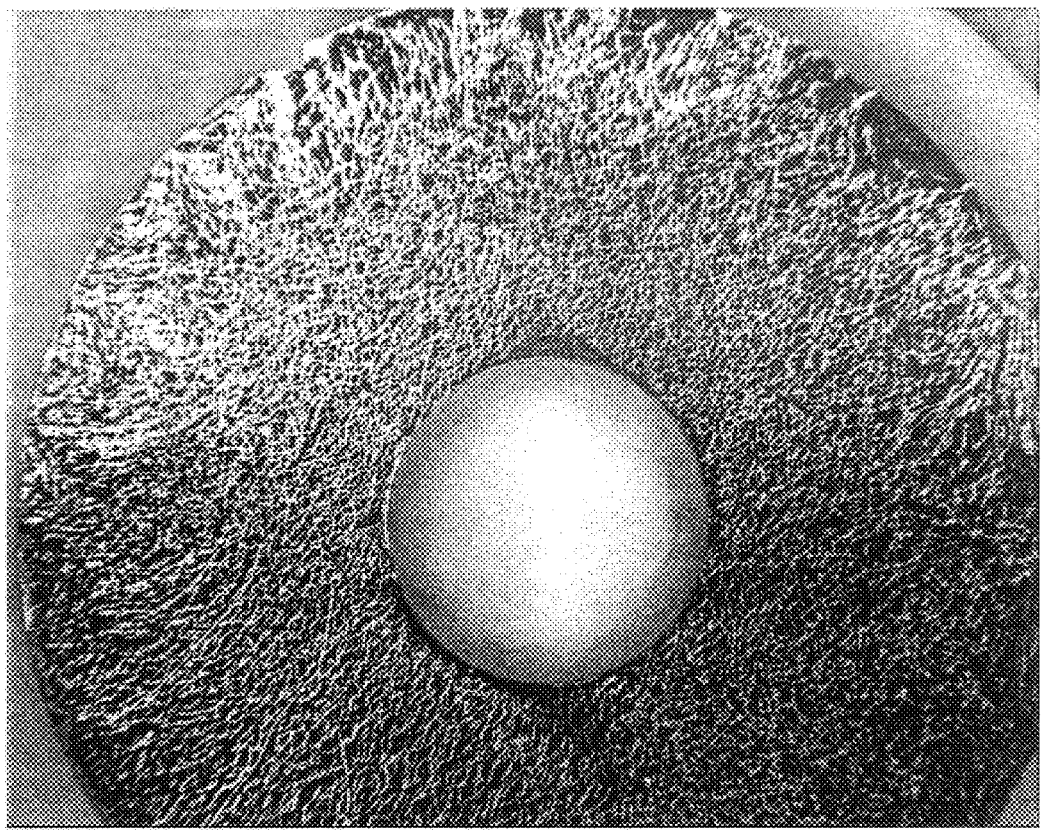
FIG. 3 is a microscope photograph of a magnetic disk after having been treated with sulphur dioxide, in accordance with a preferred embodiment of the present invention.
Figure 4:
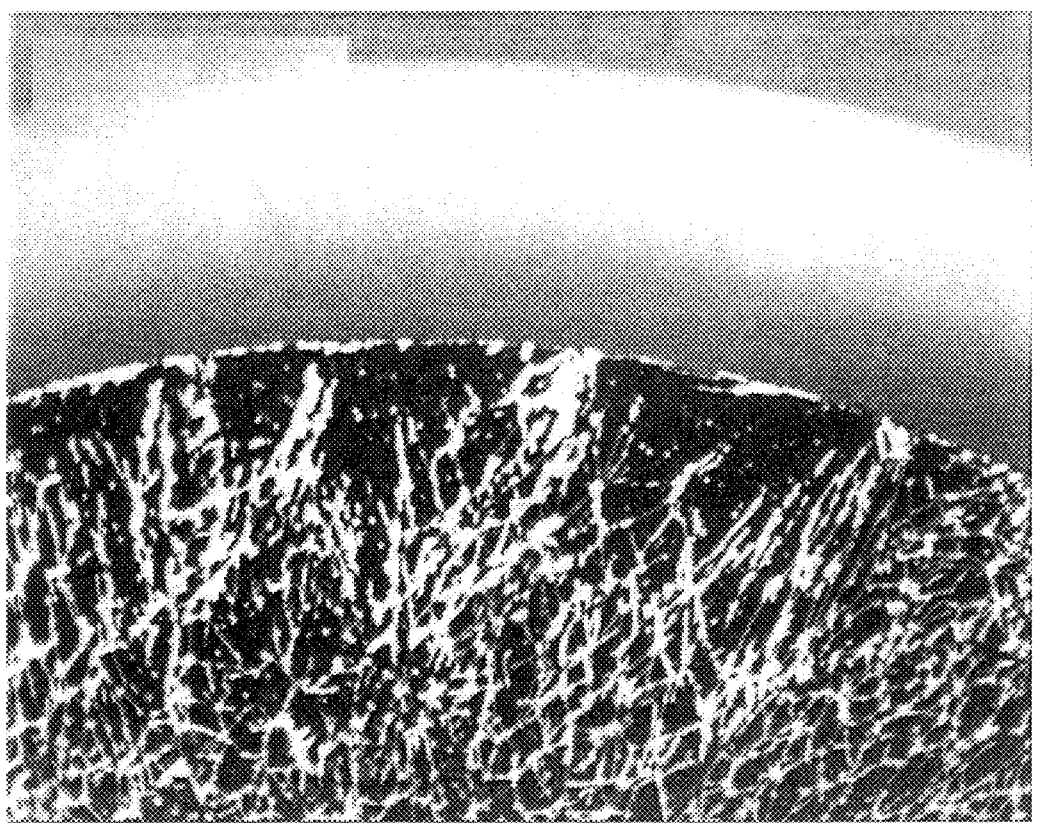
FIG. 4 is a detailed view of the photograph in FIG. 3.

Referring now to FIG. 3, there is illustrated a microscope photograph of a magnetic disk after having been treated with sulphur dioxide, in accordance with a preferred embodiment of the present invention. A more detailed view of FIG. 3 is depicted in FIG. 4. In FIG. 4, cracks and holes can be seen to be present on the magnetic disk. Upon treatment with hot water, the crack and holes will form the starting point for immediate delamination of the layered structure from the glass substrate (plug effect).

As has been described, the present invention provides a simple and economical method for recycling magnetic disks having glass substrates. The glass substrate of the recycled magnetic disk can be sputtered again, and the recycle magnetic disk can pass climatic tests very well. In case there should still be some remains on the glass substrate, the glass substrate will have to be slightly polished in order to be used as a substrate again for the magnetic disk.

The present invention is not restricted to magnetic disks but can also be used with all glass substrates carrying thin layers. Although a desiccator is used to illustrate the present invention, the method of the present invention does not necessarily have to be performed in a desiccator. Any apparatus that allows a defined adjustment of air humidity and an exact metered addition of sulphur dioxide, such as a climatic cabinet, may be used. Furthermore, more than one magnetic disk may be processed at the same time.

While the invention has been particularly shown and described with reference to a preferred embodiment, it will be understood by those skilled in the art that various changes in form and detail may be made therein without departing from the spirit and scope of the invention.

What is claimed is:

1. A method for recycling a disk having a layered structure on a glass substrate, said method comprising:

exposing said disk to gaseous sulphur dioxide in a humid environment; and treating said disk with hot water to remove said layered structure from said glass substrate.

2. The method of claim 1, wherein said layered structure includes a NiAl layer, a chromium layer, a magnetic layer, and a carbon overcoat.

3. The method of claim 2, wherein said magnetic layer is a cobalt-based layer.

4. The method of claim 1, wherein said glass substrate includes a lubricant layer.

5. The method of claim 4, wherein said method further includes a step of removing said lubricant layer before exposing said glass substrate to said gaseous sulphur dioxide.

6. The method of claim 1, wherein the concentration of said gaseous sulphur oxide is approximately between 5 vol-% and 50 vol-%.

7. The method of claim 1, wherein the concentration of said gaseous sulphur oxide is approximately between 10 vol-% and 20 vol-%.

8. The method of claim 1, wherein the humidity value of said humid environment is in approximately between 60% and 98%.

9. The method of claim 1, wherein the humidity value of said humid environment is in approximately between 85% and 95%.

10. The method of claim 1, wherein the temperature of said hot water is approximately between 80° C. to 95° C.

11. The method of claim 1, wherein the temperature of said hot water is approximately between 85° C. to 90° C.

* * * * *